(12) United States Patent
Ernest et al.

(10) Patent No.: US 9,845,713 B2
(45) Date of Patent: *Dec. 19, 2017

(54) ENGINE SYSTEM AND OPERATION METHOD USING ENGINE BRAKING MECHANISMS FOR EARLY EXHAUST VALVE OPENING

(71) Applicant: Jacobs Vehicle Systems, Inc., Bloomfield, CT (US)

(72) Inventors: Steven N. Ernest, Windsor, CT (US); Darius Mehta, San Antonio, TX (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/954,413

(22) Filed: Nov. 30, 2015

(65) Prior Publication Data

US 2016/0146072 A1    May 26, 2016

Related U.S. Application Data

(63) Continuation of application No. 14/008,811, filed as application No. PCT/US2013/027601 on Feb. 25, 2013, now Pat. No. 9,234,467.

(Continued)

(51) Int. Cl.
*F02D 13/04* (2006.01)
*F01L 1/34* (2006.01)
(Continued)

(52) U.S. Cl.
CPC ............. *F01L 13/0036* (2013.01); *F01L 1/08* (2013.01); *F01L 1/24* (2013.01); *F01L 13/06* (2013.01);
(Continued)

(58) Field of Classification Search
CPC ........ F02B 33/22; F02B 29/00; F02D 17/026; F02D 13/0249; F01L 9/023; F01L 1/06;
(Continued)

(56) References Cited

U.S. PATENT DOCUMENTS 2,397,511 A * 4/1946 Schreck ................. F02B 43/00
                                                        123/90.16
5,445,117 A * 8/1995 Mendler ................. F01L 1/185
                                                        123/90.16

(Continued)

FOREIGN PATENT DOCUMENTS

JP    H08284696 A    10/1996
JP    H09100729 A     4/1997

(Continued)

*Primary Examiner* — Marguerite McMahon
*Assistant Examiner* — Tea Holbrook
(74) *Attorney, Agent, or Firm* — Moreno IP Law LLC

(57) ABSTRACT

A valve actuation system for an internal combustion engine is disclosed. The engine has a first set of cylinders having a first set of exhaust valves and a second set of cylinders having a second set of exhaust valves. The valve actuation system for the exhaust valves includes one or more first cams having a compression-release lobe and a main exhaust lobe adapted to transfer valve actuation motion to the first set of exhaust valves, and one or more second cams having an early exhaust valve opening (EEVO) lobe and a main exhaust lobe adapted to transfer valve actuation motion to the second set of exhaust valves. The valve actuation system may provide any combination of (i) main exhaust valve actuation with or without compression release actuation with (ii) main exhaust valve actuation with or without EEVO for the two sets of cylinders.

29 Claims, 6 Drawing Sheets

Related U.S. Application Data

(60) Provisional application No. 61/602,558, filed on Feb. 23, 2012.

(51) Int. Cl.
*F01L 13/00* (2006.01)
*F02D 13/02* (2006.01)
*F01L 1/08* (2006.01)
*F01L 13/06* (2006.01)
*F01L 1/24* (2006.01)
*F02D 41/00* (2006.01)
*F02D 41/12* (2006.01)

(52) U.S. Cl.
CPC ..... *F02D 13/0246* (2013.01); *F02D 13/0273* (2013.01); *F02D 13/04* (2013.01); *F02D 41/006* (2013.01); *F02D 41/008* (2013.01); *F02D 41/12* (2013.01); *F02D 2041/001* (2013.01); *Y02T 10/47* (2013.01)

(58) Field of Classification Search
CPC ... F01L 13/00; F01L 13/06; F01L 1/02; F01L 1/024; F01L 1/12; F01L 1/34; F01L 2001/0535
USPC ...... 123/321, 322, 90.1, 90.15–90.18, 90.27, 123/90.6
See application file for complete search history.

(56) References Cited

U.S. PATENT DOCUMENTS

| | | | | |
|---|---|---|---|---|
| 5,680,841 A * | 10/1997 | Hu | ............ | F01L 1/181 123/321 |
| 5,829,397 A * | 11/1998 | Vorih | ............ | F01L 1/181 123/198 D |
| 6,125,828 A * | 10/2000 | Hu | ............ | F01L 1/181 123/321 |
| 6,189,504 B1 * | 2/2001 | Israel | ............ | F01L 13/06 123/321 |
| 6,647,954 B2 * | 11/2003 | Yang | ............ | F01L 9/021 123/321 |
| 7,146,949 B2 * | 12/2006 | Mendler | ............ | F01L 1/022 123/90.16 |
| 7,565,896 B1 * | 7/2009 | Yang | ............ | F02D 13/04 123/321 |
| 7,712,449 B1 * | 5/2010 | Schwoerer | ............ | F01L 1/08 123/321 |
| 7,905,208 B2 * | 3/2011 | Ruggiero | ............ | F01L 1/08 123/90.12 |
| 2003/0221663 A1 * | 12/2003 | Vanderpoel | ............ | F01L 1/08 123/321 |
| 2005/0145216 A1 * | 7/2005 | Yang | ............ | F02M 26/01 123/321 |
| 2005/0252484 A1 * | 11/2005 | Vanderpoel | ............ | F01L 1/08 123/321 |
| 2007/0095312 A1 * | 5/2007 | Vanderpoel | ............ | F01L 1/047 123/90.16 |
| 2008/0210197 A1 * | 9/2008 | Smith | ............ | F02D 9/06 123/321 |
| 2010/0319657 A1 * | 12/2010 | Dodi | ............ | F01L 13/065 123/321 |
| 2011/0197833 A1 * | 8/2011 | Vorih | ............ | F02D 13/0234 123/90.12 |
| 2011/0265746 A1 * | 11/2011 | Fabros | ............ | F01L 1/14 123/90.12 |
| 2012/0024260 A1 * | 2/2012 | Groth | ............ | F01L 1/18 123/321 |
| 2012/0042649 A1 * | 2/2012 | Kaneko | ............ | F01L 1/08 60/614 |

FOREIGN PATENT DOCUMENTS

| | | |
|---|---|---|
| JP | 2001510259 A | 7/2001 |
| JP | 2001527182 A | 12/2001 |
| JP | 2007211688 A | 8/2007 |
| JP | 2009542960 A | 12/2009 |

* cited by examiner

ENGINE SYSTEM AND OPERATION METHOD USING ENGINE BRAKING MECHANISMS FOR EARLY EXHAUST VALVE OPENING

FIELD

The present invention relates generally to systems and methods for controlling engine combustion chamber valves in an internal combustion engine. In particular, the present invention relates to systems and methods for providing lost motion engine valve actuation of one or more engine valves, preferably, but not necessarily, including lost motion engine braking and early exhaust valve opening (EEVO).

BACKGROUND

Engine combustion chamber valves, such as intake and exhaust valves, are typically spring biased toward a valve closed position. In many internal combustion engines, the engine valves may be opened and closed by fixed profile cams in the engine, i.e., by a valve train element More specifically, valves may be opened or closed by one or more fixed lobes which may be an integral part of each of the cams. In some cases, the use of fixed profile cams may make it difficult to adjust the timings and/or amounts of engine valve lift. It may be desirable, however, to adjust valve opening times and/or lift for various engine operating conditions, such as positive power operation versus engine braking operation, or for different engine speeds during positive power and engine braking operation.

A method of adjusting valve timing and lift given a fixed cam profile, is to incorporate a "lost motion" device in the valve train linkage between the engine valve and the cam. Lost motion is the term applied to a class of technical solutions for modifying the valve motion dictated by a cam profile with a variable length mechanical, hydraulic, or other linkage means. The lost motion system may comprise a variable length device included in the valve train linkage between the cam and the engine valve. The lobe(s) on the cam may provide the "maximum" (longest dwell and greatest lift) motion needed for a range of engine operating conditions. When expanded fully, the variable length device (or lost motion system) may transmit all of the cam motion to the valve, and when contracted fully, transmit none or a reduced amount of cam motion to the valve. By selectively decreasing the length of the lost motion system, part or all of the motion imparted by the cam to the valve can be effectively subtracted or "lost"

Hydraulic-based lost motion systems may provide a variable length device through use of a hydraulically extendable and retractable piston assembly. The length of the device is shortened when the piston is retracted into its hydraulic chamber, and the length of the device is increased when the piston is extended out of the hydraulic chamber. Alternatively, a hydraulic-based lost motion system may utilize a hydraulic circuit including a master piston and a slave piston which is selectively charged with hydraulic fluid to actuate an engine valve. The master and slave circuit may be depleted of hydraulic fluid when it is desired to "lose" the valve actuation motion input to the master piston, and the circuit may be charged with hydraulic fluid when it is desired to transfer the motion from the master piston to the slave piston and the engine valve. One or more hydraulic fluid control valves may be used to control the flow of hydraulic fluid into and out of the hydraulic chamber or hydraulic circuit.

One type of lost motion system, known as a Variable Valve Actuation (VVA) system, may provide multiple levels of lost motion. Hydraulic VVA systems may employ a high-speed control valve, referred to herein as a trigger valve, to rapidly change the amount of hydraulic fluid in the hydraulic chamber or circuit between the master and slave lost motion pistons. The trigger valve may be capable of rapidly draining hydraulic fluid from the chamber or circuit, thereby allowing the lost motion system to selectively lose a portion of an engine valve event to provide variable levels of valve actuation.

In the lost motion system of U.S. Pat. No. 5,680,841, an engine cam shaft may actuate a master piston which displaces fluid from its hydraulic chamber into a hydraulic chamber of a slave piston. The slave piston in turn acts on the engine valve to open it. The lost motion system may include a solenoid trigger valve in communication with the hydraulic circuit that includes the chambers of the master and slave pistons. The solenoid valve may be maintained in a closed position in order to retain hydraulic fluid in the circuit when the master piston is acted on by certain of the cam lobes. As long as the solenoid valve remains closed, the slave piston and the engine valve respond directly to the hydraulic fluid displaced by the motion of the master piston, which reciprocates in response to the cam lobe acting on it. When the solenoid is opened, the circuit may drain, and part or all of the hydraulic pressure generated by the master piston may be absorbed by the circuit rather than be applied to displace the slave piston and the engine valve.

Engine benefits from lost motion systems can be achieved by creating complex cam profiles with extra lobes or bumps to provide auxiliary valve lifts in addition to the conventional main intake and exhaust events. A number of unique modes of engine exhaust valve actuation may be produced by a lost motion system that includes multi-lobed cams. The lost motion system may be used to selectively cancel or activate different combinations of valve lifts made possible from the assortment of lobes provided on the exhaust cams. As a result, significant improvements may be made to both positive power and engine braking operation of the engine.

One particular engine valve actuation enabled by lost motion systems and methods operating in accordance with embodiments of the present invention is compression release engine braking operation. During engine braking, the exhaust valves may be selectively opened to convert, at least temporarily, an internal combustion engine into an air compressor. This air compressor effect may be accomplished by partially opening one or more exhaust valves near piston top dead center position for compression-release type braking, or by maintaining one or more exhaust valves in a partially open position for much or all of the piston motion for bleeder type braking. In doing so, the engine develops retarding horsepower to help slow the vehicle down. This can provide the operator increased control over the vehicle and substantially reduce wear on the service brakes of the vehicle. A properly designed and adjusted engine brake can develop retarding horsepower that is a substantial portion or even in excess of the level of operating horsepower developed by the engine in positive power.

Another engine valve actuation that may be provided using lost motion systems and methods in accordance with embodiments of the present invention is Early Exhaust Valve Opening (EEVO) during positive power operation of an engine. EEVO denotes the process of opening an engine exhaust valve for the exhaust stroke of the engine at a time that is earlier than the time the exhaust valve is normally opened for the exhaust stroke of the cylinder piston.

Embodiments of the present invention contemplate selectively opening one or more engine exhaust valves for EEVO, starting as early as immediately after top dead center (TDC) position for the engine piston on the exhaust stroke, and as late as 90° crank angle degrees past TDC on the exhaust stroke. During positive power operation, EEVO operation may provide one or more benefits, including but not limited to: (i) providing combustion energy to the downstream exhaust path to enhance turbocharger speed and reduce turbo lag for improved transient performance and (ii) to provide higher torque production at lower engine speeds by increasing boost pressure, and (iii) sending exhaust energy (heat) to the engine after-treatment system to warm it up more quickly, (or maintain an elevated temperature), which may increase the efficiency of the after-treatment system and thus be able to reduce its required size and cost. Therefore there is a need for a valve actuation system that is capable of selectively providing EEVO in response to engine operation conditions.

System and method embodiments of the present invention recognize that the ability to provide both compression release engine braking and EEVO using engine exhaust valves would be advantageous. Accordingly, there is a need for a lost motion system, and in particular a variable valve actuation lost motion system, that utilizes a single control valve, preferably a trigger valve, for control of more than one engine valves to provide compression release engine braking and EEVO, and/or potentially other engine valve actuations.

Space and weight considerations are also of considerable concern to engine manufacturers. Accordingly it is desirable to reduce the size and weight of the engine subsystems responsible for valve actuation. Some embodiments of the present invention are directed towards meeting these needs by providing a simple on-off lost motion system for selectively providing EEVO during positive power engine operation and compression-release braking during engine braking operation.

Various embodiments of the present invention may meet one or more of the aforementioned needs and provide other benefits as well. Additional advantages of the invention are set forth, in part, in the description that follows and, in part, will be apparent to one of ordinary skill in the art from the description and/or from the practice of the invention.

SUMMARY

In an internal combustion engine having at least two cylinders and at least one exhaust valve providing selective communication between each cylinder and an exhaust manifold, Applicants have developed an innovative method of operating the engine and actuating the exhaust valves in each cylinder comprising the steps of: providing one or more first cams having a compression-release lobe and a main exhaust lobe adapted to transfer valve actuation motion to a first exhaust valve associated with a first cylinder; providing one or more second cams having an early exhaust valve opening lobe and a main exhaust lobe adapted to transfer valve actuation motion to a second exhaust valve associated with a second cylinder; and operating the engine in a first positive power mode of operation in which the first exhaust valve in the first cylinder is actuated for a main exhaust event without being actuated for a compression-release event, and the second exhaust valve in the second cylinder is actuated for a main exhaust event without being actuated for an early exhaust valve opening event.

Applicants have further developed an innovative method of operating the engine in a second positive power mode of operation in which the first exhaust valve in the first cylinder is actuated for a main exhaust event without being actuated for a compression-release event, and the second exhaust valve in the second cylinder is actuated for a main exhaust event and for an early exhaust valve opening event.

Applicants have further developed an innovative method of operating the engine in a third positive power mode of operation in which the first exhaust valve in the first cylinder is actuated for a main exhaust event and for a compression-release event, and the second exhaust valve in the second cylinder is actuated for a main exhaust event and for an early exhaust valve opening event.

Applicants have further developed an innovative method of operating the engine in a first engine braking mode of operation in which the first exhaust valve in the first cylinder is actuated for a main exhaust event and for a compression-release event, and the second exhaust valve in the second cylinder is actuated for a main exhaust event and for an early exhaust valve opening event.

Applicant has still further developed an innovative valve actuation system for an internal combustion engine having a first set of cylinders having a first set of exhaust valves and a second set of cylinders having a second set of exhaust valves, said valve actuation system, comprising: a first set of cylinders having a first set of exhaust valves; a second set of cylinders having a second set of exhaust valves; one or more first cams having a compression-release lobe and a main exhaust lobe adapted to transfer valve actuation motion to the first set of exhaust valves; one or more second cams having an early exhaust valve opening lobe and a main exhaust lobe adapted to transfer valve actuation motion to the second set of exhaust valves; and one or more valve train elements connecting the first cams with the first set of exhaust valves and the second cams with the second set of exhaust valves.

Applicants have further developed an innovative valve actuation system further comprising: an engine controller adapted to operate the engine using the one or more valve train elements and first cams and second cams to provide any combination of (i) main exhaust valve actuation with or without compression release actuation with (ii) main exhaust valve actuation with or without EEVO for the two sets of cylinders.

It is to be understood that both the foregoing general description and the following detailed description are exemplary and explanatory only, and are not restrictive of the invention as claimed. The accompanying drawings, which are incorporated herein by reference, and which constitute a part of the specification, illustrate certain embodiments of the invention and, together with the detailed description, serve to explain the principles of the present invention.

BRIEF DESCRIPTION OF THE DRAWINGS

In order to assist in the understanding of the invention, reference will now be made to the appended drawings, in which like reference characters refer to like elements. The drawings are exemplary only, and should not be construed as limiting the invention.

DETAILED DESCRIPTION OF THE PRESENT EMBODIMENTS

As embodied herein, the present invention includes both systems and methods of controlling the actuation of engine valves. Reference will now be made in detail to a first embodiment of the present invention, an example of which is illustrated in the accompanying drawings. A first embodiment of the present invention is shown in FIG. 1 as valve actuation system 100.

Embodiments of the present invention may be used in an internal combustion engine to provide engine braking exhaust valve actuation in which one or more engine cylinders provide compression release braking and main exhaust valve actuation while one or more other engine cylinders provide EEVO with main exhaust valve actuation as non-optimal engine braking. Further, embodiments of the present invention may be used in an internal combustion engine to provide positive power exhaust valve actuation in which one or more engine cylinders provide main exhaust valve actuation without (i.e. disabled) compression release braking while one or more engine cylinders provide main exhaust valve actuation with or without EEVO. Still further, embodiments of the present invention may be used to provide positive power engine operation in which less than all of the engine cylinders produce EEVO and main exhaust valve actuation, while one or more of the remaining cylinders produces main exhaust valve actuation without compression release engine braking. Still further, embodiments of the present invention may be used to provide positive power engine operation in which less than all of the engine cylinders produce EEVO and main exhaust valve actuation, while one or more of the remaining cylinders produces compression release engine braking without fueling and with or without main exhaust valve actuation.

Figure 1:
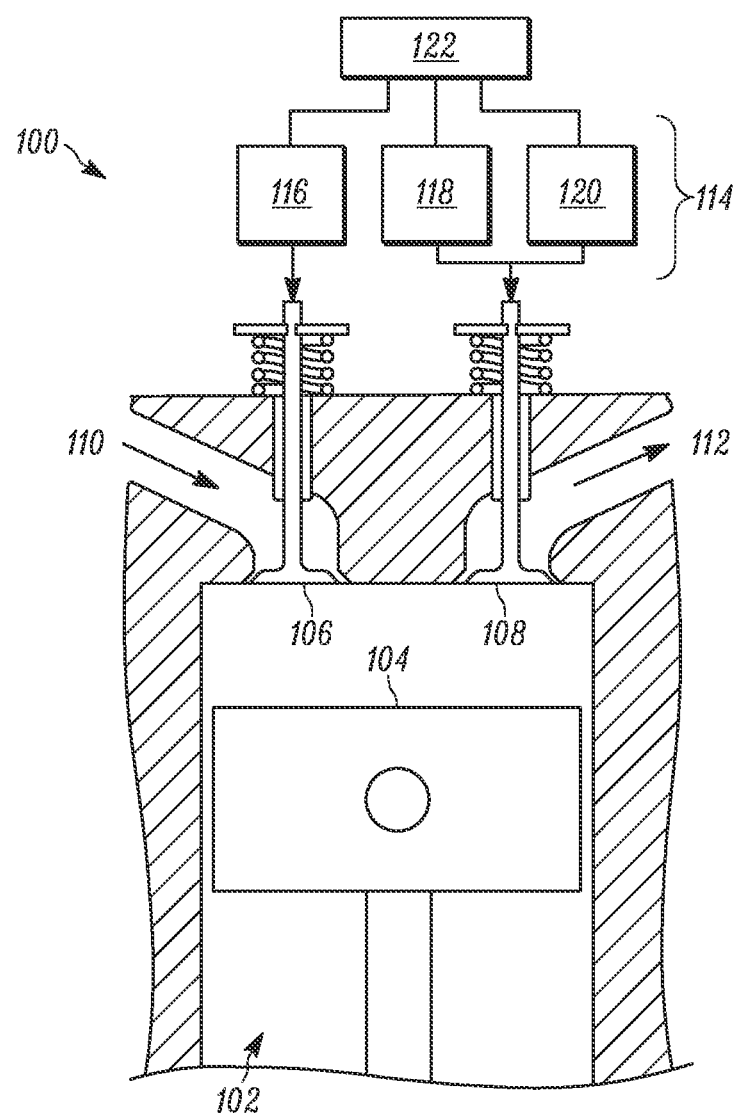
FIG. 1 is a schematic cross-sectional diagram of an engine valve actuation system in accordance with a first embodiment of the present invention.

FIG. 1 is a schematic diagram of an exemplary valve actuation system 100 capable of implementing the exhaust valve actuations shown in FIGS. 2-19. The valve actuation system 100 may have a cylinder 102 in which a piston 104 may reciprocate upward and downward repeatedly during the time the engine is in operation. At the top of the cylinder 102, there may be at least one intake valve 106 and at least one exhaust valve 108. The intake valve 106 and the exhaust valve 108 may be opened and closed to provide communication with an intake gas passage 110 and an exhaust gas passage 112, respectively. The intake valve 106 and exhaust valve 108 may be opened and closed by valve actuating subsystems 114, such as, for example, an intake valve actuating subsystem 116, a positive power exhaust valve actuating subsystem 118, and an engine braking/EEVO exhaust valve actuating subsystem 120. The positive power exhaust valve actuating subsystem 118 and the engine braking/EEVO exhaust valve actuating subsystem 120 may be integrated into a single system in some embodiments or separate in others.

The valve actuating subsystems 114 may include any number of mechanical, hydraulic, hydro-mechanical, electromagnetic, or other type of valve train element. The valve actuating subsystems 114 may also include a common rail or lost motion system. In preferred embodiments, the exhaust valve actuating subsystems 118 and/or 120 preferably include one or more cams, 200, 210, 220 and 230 having one or more lobes 202, 204, 212, 214, 222, and/or 232, as shown in FIGS. 10-14. In the preferred embodiments, the exhaust valve actuating subsystems 118 and 120 may also include one or more rocker arms, valve bridges, and/or push tubes which are known in the art and used to transfer valve actuation motion from the cams 200, 210, 220 and 230 to the exhaust valves 108.

The valve actuating subsystems 114 may actuate the intake valve 106 and exhaust valve 108 to produce engine valve events, such as, but not limited to: main intake, main exhaust, compression release braking, and EEVO. In this application, EEVO is defined as opening of an exhaust valve during the cylinder piston expansion stroke at a point after TDC of the compression stroke but before a point that the exhaust valve normally opens for main exhaust valve actuation. Compression release (CR) braking is defined as opening of an exhaust valve during the cylinder piston compression stroke at or near in advance of a point before TDC of the compression stroke.

The valve actuating subsystems 114 may be controlled by a controller 122 to selectively control, for example, the amount and timing of the engine valve actuations. The controller 122 may comprise any electronic, mechanical, hydraulic, electrohydraulic, or other type of control device for communicating with the valve actuating subsystems 114 and causing some or all of the possible intake and exhaust valve actuations to be transferred to the intake valve 106 and the exhaust valve 108. The controller 122 may include a microprocessor and instrumentation linked to other engine components to determine and select the appropriate operation of the engine valves based on inputs such as engine speed, vehicle speed, oil temperature, coolant temperature, manifold (or port) temperature, manifold (or port) pressure, cylinder temperature, cylinder pressure, particulate information, other exhaust gas parameters, driver inputs, transmission inputs, vehicle controller inputs, engine crank angle, and various other engine and vehicle parameters. This information may be used by the controller 122 to control the valve actuating subsystems 114 over various operating conditions for various operations, such as positive power, engine braking, and EEVO.

In accordance with preferred embodiments of the present invention, the valve actuation system 100 of FIG. 1 may provide on-off control of compression release engine braking exhaust valve events, as well as on-off control of EEVO events, which are illustrated in FIGS. 2-19. By varying the valve timing (i.e., the times at which the engine valves are opened and/or closed), engine performance during positive power and engine braking may be improved.

FIGS. 2-19 illustrate engine valve lifts and cam profiles over a full four engine cycles of 720 degrees, which include two top dead center (TDC) engine piston positions and two bottom dead center (BDC) engine piston positions spaced along the horizontal axis. The four phases or strokes of diesel operation of a typical internal combustion engine, namely, expansion, exhaust, intake, and compression are labeled and are intended to define these four phases or strokes. Each of the four individual cycles is generally denoted by 180 degrees of crank shaft rotation, although it is recognized that such phases and strokes may not align precisely with 180 degrees of engine crank angle rotation.

Figure 2:
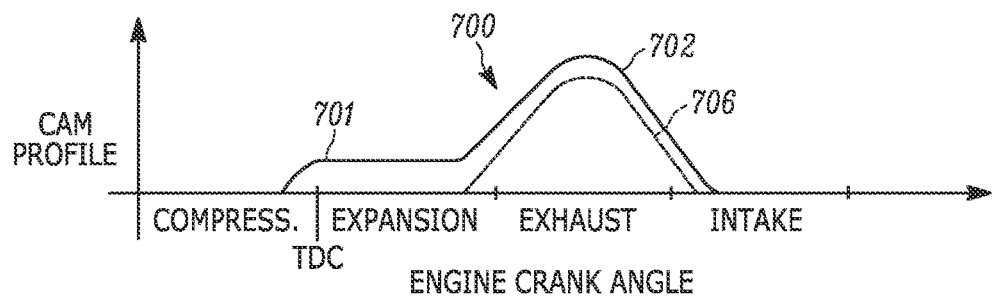
FIG. 2 is a graph of a first cam profile that may act on an exhaust valve actuation system, such as illustrated in FIG. 1, to provide compression release engine braking and main exhaust valve actuation in accordance with an embodiment of the present invention.
Figure 3:
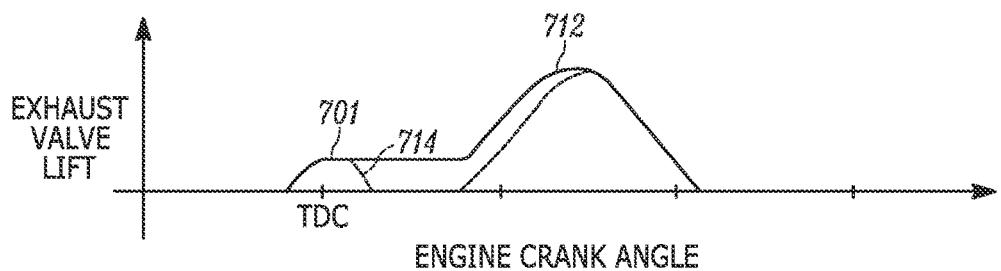
FIG. 3 is a graph of valve lift versus engine crank angle illustrating the compression release engine braking and main exhaust valve actuations that may be provided by the cam profile illustrated in FIG. 2.

Description of the use of the system 100 illustrated in FIG. 1 to provide compression release and EEVO valve actuations will now be provided with reference to FIGS. 1-19. In an internal combustion engine, and with reference to FIGS. 2 and 10, a first set of cams 200 represented by a profile 700 may include a compression release lobe 202 and a main exhaust lobe 204 (FIG. 10), represented by compression release bump 701 and main exhaust lobe 702 (FIG. 2). The profile of a conventional cam having only a main exhaust lobe 706 is illustrated for comparison purposes. The cam 200, the profile of which is illustrated in FIG. 2, may be used to provide the exhaust valve actuations shown in FIG. 3 by selectively using an exhaust valve actuating subsystem 118 and/or 120. Namely, for one or more, but not all, of the engine cylinders in an engine, one or more cams 200, with profiles 700 may be used to selectively open the one or more exhaust valves 108 associated with the engine cylinders for a compression release event 710 and a main exhaust event 712 by engaging an exhaust valve actuating subsystem 118 and/or 120 to transfer the motion from the cam lobes 701 and 702 to the exhaust valves 108. With reference to FIG. 3, if the exhaust valve actuating subsystems 118 and/or 120 are provided with a reset mechanism, the compression release event 710 provided by the cam lobe 701 may take the form of event 714, shown in FIG. 3.

Figure 4:
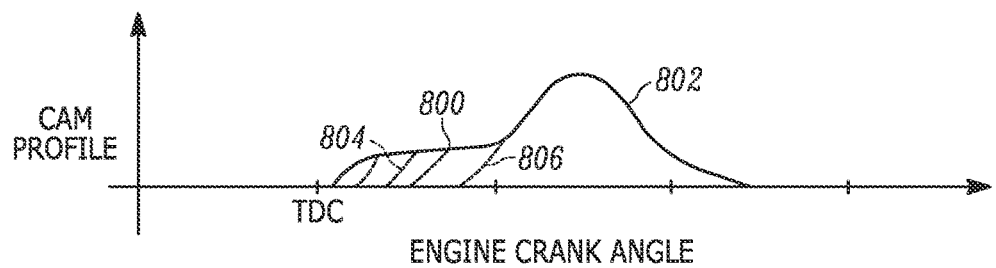
FIG. 4 is a graph of a second cam profile that may act on an engine valve actuation system, such as illustrated in FIG. 1, to provide early exhaust valve opening and main exhaust valve actuation in accordance with an embodiment of the present invention.
Figure 5:
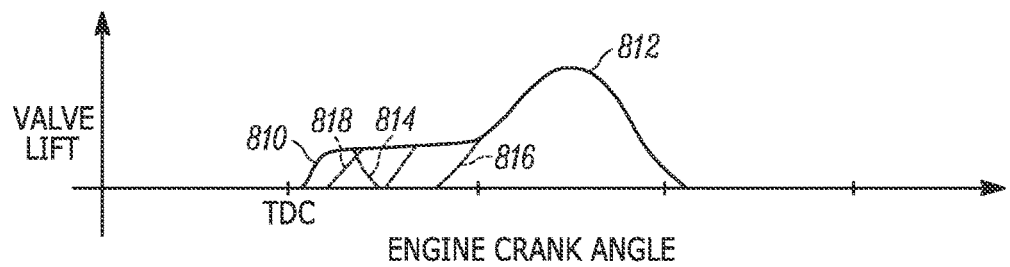
FIG. 5 is a graph of valve lift versus engine crank angle illustrating the early exhaust valve opening and main exhaust valve actuations that may be provided by the cam profile illustrated in FIG. 4.
Figures 10, 11:
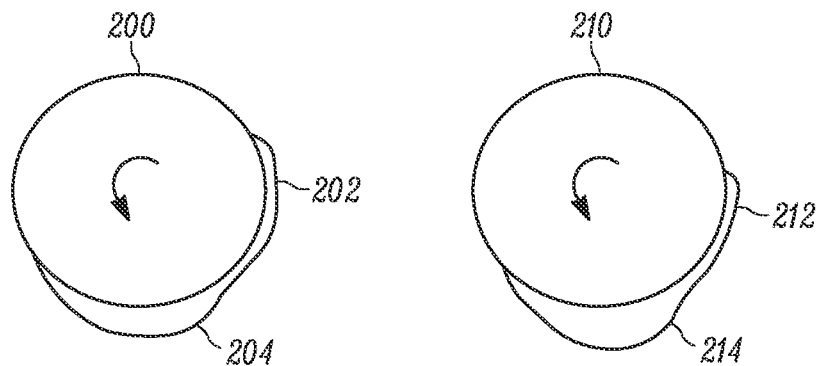
FIG. 10 is an illustration of a cam having compression release and main exhaust lobes.
FIG. 11 is an illustration of a cam having EEVO and main exhaust lobes.

With reference to FIGS. 4 and 11, in the same internal combustion engine referenced in connection with FIGS. 4 and 11, a second set of one or more cams 210 represented by a profile 800 may include an EEVO lobe 212 and a main exhaust lobe 214 (FIG. 11), represented by EEVO lobe 804 and main exhaust lobe 802 (FIG. 4). The profile of a conventional cam having only a main exhaust lobe 806 is illustrated for comparison purposes. The cam 210, the profile of which is illustrated in FIG. 4, may be used to provide the exhaust valve actuations shown in FIG. 5 by selectively using the exhaust valve actuating subsystem 118 and/or 120. Namely, for one or more, but not all, of the engine cylinders in an engine, one or more cams 210, with profiles 800 may be used to selectively open the one or more exhaust valves 108 associated with the engine cylinders for EEVO events 810, 814, 818, or at any crank angle between 810 and 816, and a main exhaust event 812 by engaging an exhaust valve actuating subsystem 118 and/or 120 to transfer the motion from the cam lobes 802 and 804 to the exhaust valves 108. With reference to FIG. 5, if the exhaust valve actuating subsystems 118 and/or 120 are provided with a reset mechanism, the EEVO event 810 provided by the cam lobe 804 may take the form of event 814, shown in FIG. 5.

Figure 6:
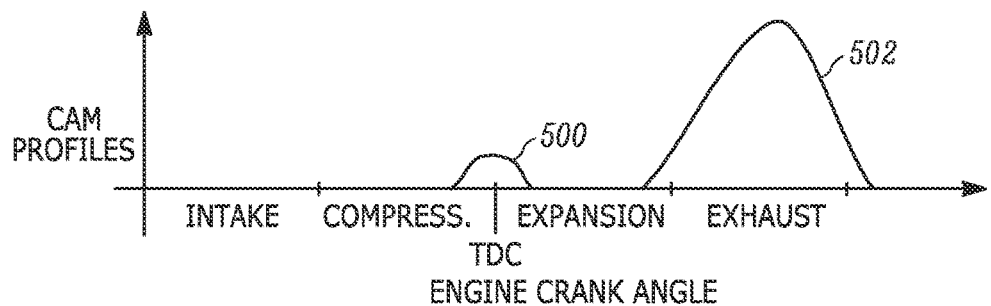
FIG. 6 is a graph of a third cam profile that may act on an engine valve actuation system, such as illustrated in FIG. 1, to provide compression release engine braking and main exhaust valve actuations in accordance with an embodiment of the present invention.
Figure 7:
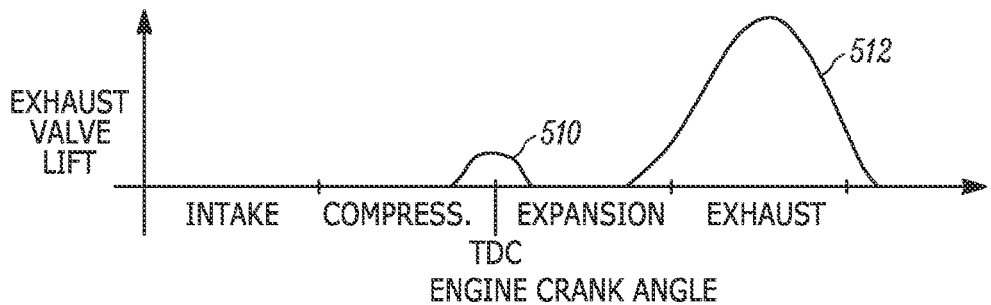
FIG. 7 is a graph of valve lift versus engine crank angle illustrating the compression release engine braking and main exhaust valve actuations that may be provided by the cam profile illustrated in FIG. 6.

With reference to an alternative embodiment, as illustrated in FIGS. 6, 7, 12 and 13, a first set of cams 220 and 230 may include a main exhaust lobe 222 (FIG. 12) and a compression release lobe 232 (FIG. 13), represented by compression release bump 500 and main exhaust bump 502 (FIG. 6). The cams 220 and 230, the profiles of which are illustrated in FIG. 6, may be used to provide the exhaust valve actuations shown in FIG. 7 by selectively using the exhaust valve actuating subsystem 118 and/or 120. Namely, for one or more, but not all, of the engine cylinders in an engine, one or more cams 220, with lobe 222 and profile 502, may be used to selectively open the one or more exhaust valves 108 associated with the engine cylinders for a main exhaust event 512 by engaging an exhaust valve actuating subsystem 118 and/or 120 to transfer the motion from the cam lobe 222 to the exhaust valves 108. In connection with the same engine cylinders, one or more cams 230, with lobe 232 and profile 500, may be used to selectively open the one or more exhaust valves 108 associated with the same engine cylinders for a compression release event 510.

Figure 8:
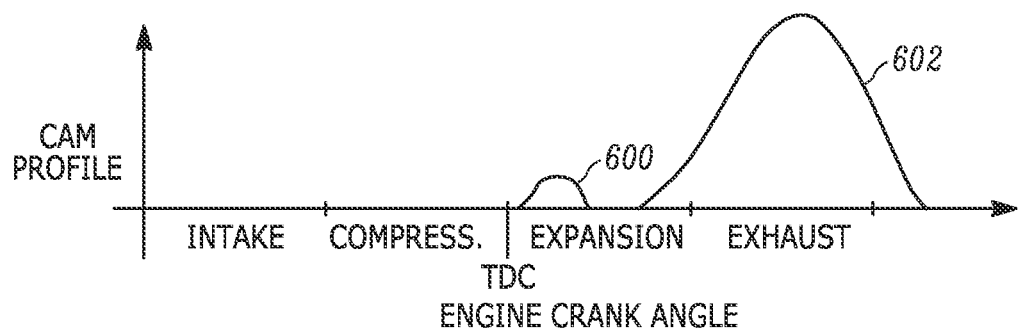
FIG. 8 is a graph of a fourth cam profile that may act on an engine valve actuation system, such as illustrated in FIG. 1, to provide early exhaust valve opening and main exhaust valve actuations in accordance with an embodiment of the present invention.
Figure 9:
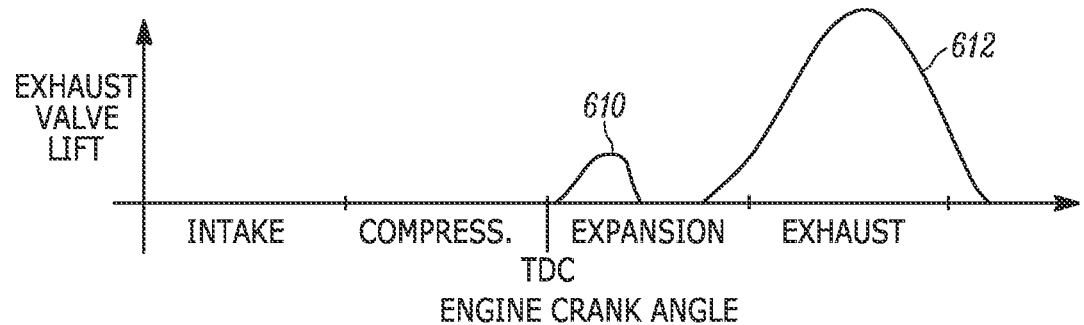
FIG. 9 is a graph of valve lift versus engine crank angle illustrating the early exhaust valve opening and main exhaust valve actuations that may be provided by the cam profile illustrated in FIG. 8.

With continued reference to the alternative embodiment, as illustrated in FIGS. 8, 9, 12 and 13, a second set of cams 220 and 230 may include a main exhaust lobe 222 (FIG. 12) and an EEVO lobe 232 (FIG. 13), represented by EEVO bump 600 and main exhaust bump 602 (FIG. 8). The cams 220 and 230, the profiles of which are illustrated in FIG. 8, may be used to provide the exhaust valve actuations shown in FIG. 9 by selectively using the exhaust valve actuating subsystem 118 and/or 120. Namely, for one or more, but not all, of the engine cylinders in an engine other than those referenced in connection with FIGS. 6 and 7 above, one or more cams 220, with lobe 222 and profile 602, may be used to selectively open the one or more exhaust valves 108 associated with the engine cylinders for a main exhaust event 612 by engaging an exhaust valve actuating subsystem 118 and/or 120 to transfer the motion from the cam lobe 222 to the exhaust valves 108. In connection with the same engine cylinders, one or more cams 230, with lobe 232 and profile 600, may be used to selectively open the one or more exhaust valves 108 associated with the same engine cylinders for an EEVO event 610.

Figures 12, 13:
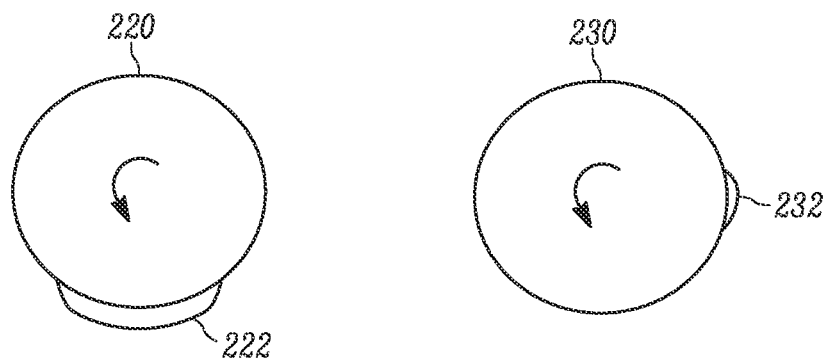
FIG. 12 is an illustration of a cam having a main exhaust lobe.
FIG. 13 is an illustration of a cam having a compression release or EEVO lobe.
Figure 14:
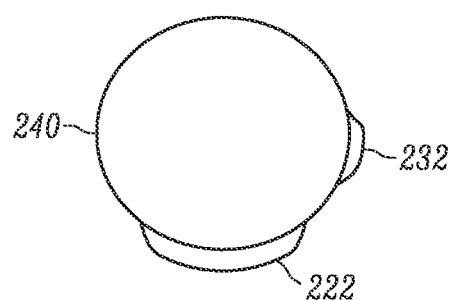
FIG. 14 is an illustration of a cam having a compression release or EEVO lobe and a main exhaust lobe.

It is appreciated that the valve actuations illustrated in FIGS. 6-9 may be provided by either separate and individual cams, as shown in FIGS. 12-13, or by a single cam, as shown in FIG. 14. The use of separate and individual cams, as shown in FIGS. 12-13, permits the system to be implemented for dedicated cam engine braking systems known in the prior art by substituting some cams 230, as shown in FIG. 13, having an EEVO lobe, for dedicated engine braking cams.

Figure 15:
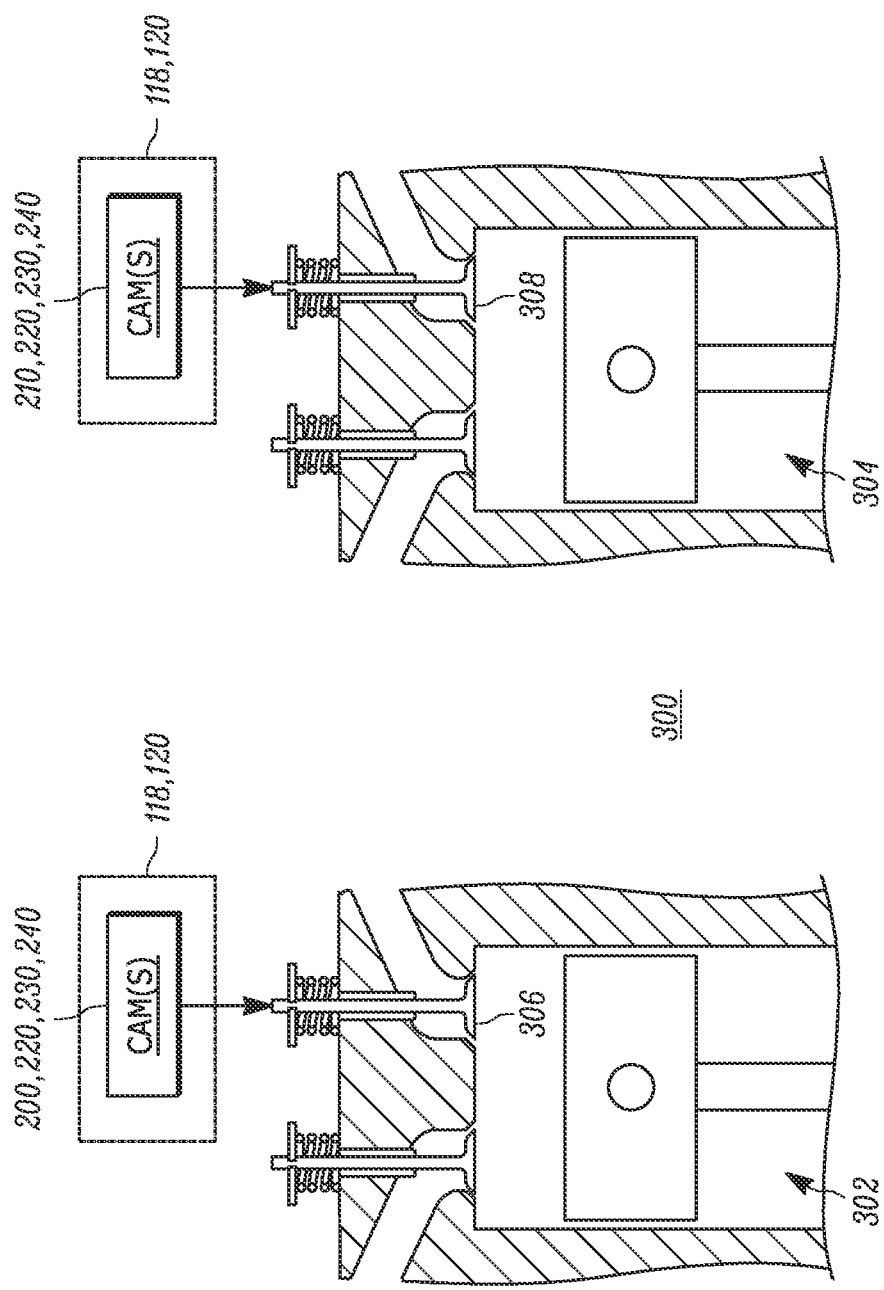
FIG. 15 is schematic illustration of an engine in accordance with the instant disclosure.

Referring now to FIG. 15, an engine 300 in accordance with the various embodiments described above is schematically illustrated. In particular, the engine 300 comprises at least two cylinders 302, 304 (only two shown) each substantially similar to the cylinder 102 and associated elements described above relative to FIG. 1. As further shown, one or more first cams 200, 220, 230, 240, as described above, are associated with the first cylinder 302, whereas one or more second cams 210, 220, 230, 240, again as described above, are associated with the second cylinder 304. More particularly, as illustrated, the first cam(s) 200, 220, 230, 240 are adapted to transfer valve actuation motion to a first exhaust valve 306 for the first cylinder 302, whereas the second cam(s) 210, 220, 230, 240 are adapted to transfer valve actuation motion to a second exhaust valve 308 for the second cylinder 304. As described above, the first cam(s) 200, 220, 230, 240 and the second cam(s) 210, 220, 230, 240 may be included within the positive power exhaust valve actuating subsystem 118 and/or the exhaust braking/EEVO exhaust valve actuating subsystem 120, which subsystems may, once again, be integrated into single subsystem or exist as separate subsystems.

In a still further alternative embodiment of the present invention, variable valve actuation (VVA) lost motion systems may be used to selectively disable main exhaust events 712, 812, 512 and/or 612 during engine braking operation.

It will be apparent to those skilled in the art that various modifications and variations can be made in the construction, configuration, and/or operation of the present invention without departing from the scope or spirit of the invention.

What is claimed is:

1. In an internal combustion engine having at least two cylinders and at least one exhaust valve providing selective communication between each cylinder and an exhaust manifold, a method of operating the engine and actuating the at least on exhaust valve in each cylinder comprising the steps of:
   providing one or more first cams having a compression-release lobe and a main exhaust lobe adapted to transfer valve actuation motion to a first exhaust valve associated with a first cylinder;
   providing one or more second cams having an early exhaust valve opening lobe and a main exhaust lobe adapted to transfer valve actuation motion to a second exhaust valve associated with a second cylinder different from the first cylinder; and
   operating the engine in a first positive power mode of operation in which the first exhaust valve in the first cylinder is actuated for a main exhaust event according to the main exhaust lobe of the one or more first cams without being actuated for a compression-release event by the compression-release lobe, and the second exhaust valve in the second cylinder is actuated for a main exhaust event according to the main exhaust lobe of the one or more second cams without being actuated for an early exhaust valve opening event by the early exhaust valve opening lobe.

2. The method of claim 1, further comprising:
   operating the engine in a second positive power mode of operation in which the first exhaust valve in the first cylinder is actuated for a main exhaust event according to the main exhaust lobe of the one or more first cams without being actuated for a compression-release event, and the second exhaust valve in the second cylinder is actuated for a main exhaust event according to the main exhaust lobe of the one or more second cams and for an early exhaust valve opening event according to the early exhaust valve opening lobe.

3. The method of claim 2, further comprising:
   operating the engine in a third positive power mode of operation in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

4. The method of claim 3, further comprising:
   operating the engine in a first engine braking mode of operation in which the engine operates as an air compressor to develop retarding horsepower and in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

5. The method of claim 2, further comprising:
   operating the engine in a first engine braking mode of operation in which the engine operates as an air compressor to develop retarding horsepower and in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

6. The method of claim 1, further comprising:
   operating the engine in a third positive power mode of operation in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

7. The method of claim 6, further comprising:
   operating the engine in a first engine braking mode of operation in which the engine operates as an air compressor to develop retarding horsepower and in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

8. The method of claim 1, further comprising:
operating the engine in a first engine braking mode of operation in which the engine operates as an air compressor to develop retarding horsepower and in which the first exhaust valve in the first cylinder is actuated for a main exhaust event according to the main exhaust lobe of the one or more first cams and for a compression-release event according to the compression-release lobe, and the second exhaust valve in the second cylinder is actuated for a main exhaust event according to the main exhaust lobe of the one or more second cams and for an early exhaust valve opening event according to the early exhaust valve opening lobe.

9. The method of claim 1 wherein said one or more first cams is comprised of a single first cam having a compression-release lobe and a main exhaust lobe.

10. The method of claim 9 wherein said one or more second cams is comprised of a single second cam having an early exhaust valve opening lobe and a main exhaust lobe.

11. The method of claim 9 wherein said one or more second cams is comprised of two cams each having one of an early exhaust valve opening lobe or a main exhaust lobe.

12. The method of claim 1 wherein said one or more first cams is comprised of two cams each having one of a compression-release lobe or a main exhaust lobe.

13. The method of claim 12 wherein said one or more second cams is comprised of a single second cam having an early exhaust valve opening lobe and a main exhaust lobe.

14. The method of claim 12 wherein said one or more second cams is comprised of two cams each having one of an early exhaust valve opening lobe or a main exhaust lobe.

15. A valve actuation system for an internal combustion engine having a first set of cylinders having a first set of exhaust valves and a second set of cylinders different from the first set of cylinders and having a second set of exhaust valves, said valve actuation system comprising:
one or more first cams having a compression-release lobe and a main exhaust lobe adapted to transfer valve actuation motion to the first set of exhaust valves;
one or more second cams having an early exhaust valve opening lobe and a main exhaust lobe adapted to transfer valve actuation motion to the second set of exhaust valves; and
one or more valve train elements connecting the first cams with the first set of exhaust valves and the second cams with the second set of exhaust valves.

16. The valve actuation system of claim 15, further comprising:
an engine controller adapted to operate the engine using the one or more valve train elements, first cams and second cams in:
a first positive power mode of operation in which the first set of exhaust valves are actuated for main exhaust events according to the main exhaust lobe of the one or more first cams without being actuated for compression-release events by the compression-release lobe, and the second set of exhaust valves are actuated for main exhaust events according to the main exhaust lobe of the one or more second cams without being actuated for early exhaust valve opening events by the early exhaust valve opening lobe.

17. The valve actuation system of claim 16, wherein the engine controller is further adapted for operating the engine in a second positive power mode of operation in which the first set of exhaust valves is actuated for a main exhaust event according to the main exhaust lobe of the one or more first cams without being actuated for a compression-release event, and the second set of exhaust valves is actuated for a main exhaust event according to the main exhaust lobe of the one or more second cams and for an early exhaust valve opening event according to the early exhaust valve opening lobe.

18. The valve actuation system of claim 17, wherein the engine controller is further adapted for operating the engine in a third positive power mode of operation in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

19. The valve actuation system of claim 18, wherein the engine controller is further adapted for operating the engine in a first engine braking mode of operation in which the engine operates as an air compressor to develop retarding horsepower and in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

20. The valve actuation system of claim 17, wherein the engine controller is further adapted for operating the engine in a first engine braking mode of operation in which the engine operates as an air compressor to develop retarding horsepower and in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

21. The valve actuation system of claim 16, wherein the engine controller is further adapted for operating the engine in a third positive power mode of operation in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

22. The valve actuation system of claim 21, wherein the engine controller is further adapted for operating the engine in a first engine braking mode of operation in which the engine operates as an air compressor to develop retarding horsepower and in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

23. The valve actuation system of claim 16, wherein the engine controller is further adapted for operating the engine in a first engine braking mode of operation in which the engine operates as an air compressor to develop retarding horsepower and in which the first set of exhaust valves is actuated for a main exhaust event according to the main exhaust lobe of the one or more first cams and for a compression-release event according to the compression-release lobe, and the second set of exhaust valves is actuated for a main exhaust event according to the main exhaust lobe of the one or more second cams and for an early exhaust valve opening event according to the early exhaust valve opening lobe.

24. The valve actuation system of claim 15 wherein said one or more first cams is comprised of a single first cam having a compression-release lobe and a main exhaust lobe.

25. The valve actuation system of claim 24 wherein said one or more second cams is comprised of a single second cam having an early exhaust valve opening lobe and a main exhaust lobe.

26. The valve actuation system of claim 24 wherein said one or more second cams is comprised of two cams each having one of an early exhaust valve opening lobe or a main exhaust lobe.

27. The valve actuation system of claim 25 wherein said one or more first cams is comprised of two cams each having one of a compression-release lobe or a main exhaust lobe.

28. The valve actuation system of claim 27 wherein said one or more second cams is comprised of a single second cam having an early exhaust valve opening lobe and a main exhaust lobe.

29. The valve actuation system of claim 27 wherein said one or more second cams is comprised of two cams each having one of an early exhaust valve opening lobe or a main exhaust lobe.

* * * * *